J. F. LAMB.
ELECTRICALLY HEATED DEVICE.
APPLICATION FILED MAY 31, 1912.
1,060,265.
Patented Apr. 29, 1913.
2 SHEETS—SHEET 1.
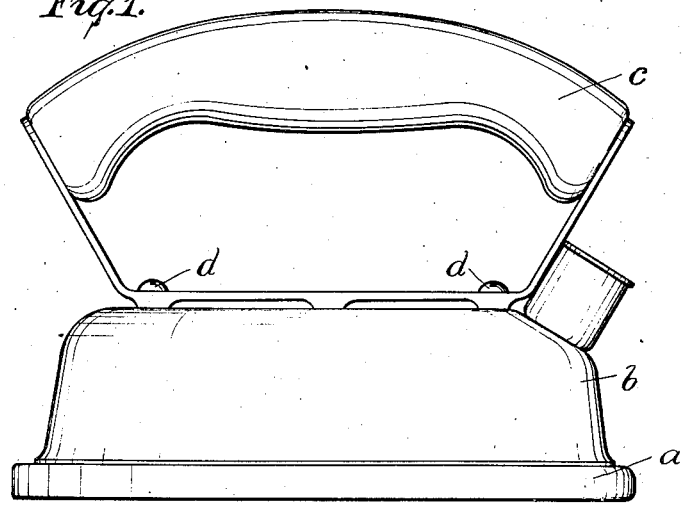
Fig. 1.
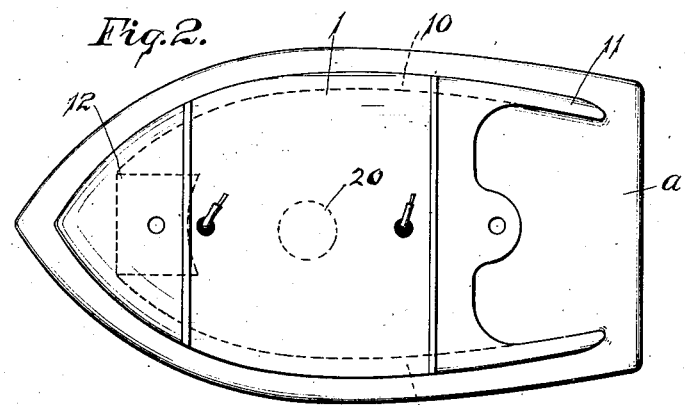
Fig. 2.
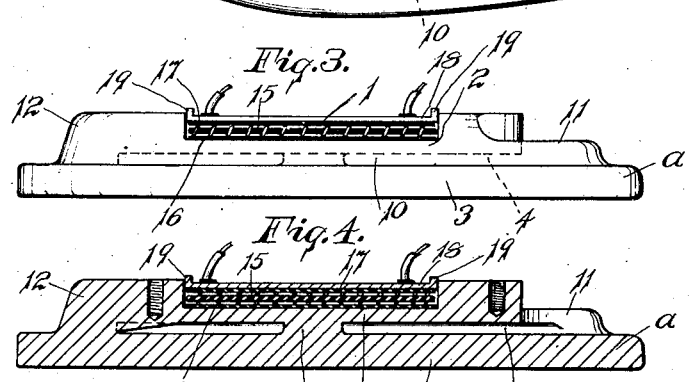
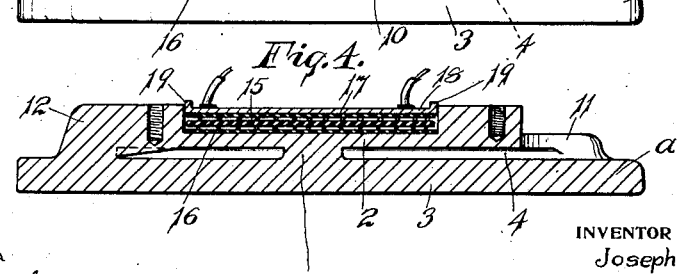
WITNESSES
Loris Lucia
Eva L. Stoughton
INVENTOR
Joseph F. Lamb:
J. E. Watt
his ATTORNEY

J. F. LAMB.
ELECTRICALLY HEATED DEVICE.
APPLICATION FILED MAY 31, 1912.

1,060,265.

Patented Apr. 29, 1913.

2 SHEETS—SHEET 2.

WITNESSES
M. D. Shuckerow
M. E. O'Neill

INVENTOR
Joseph F. Lamb:

BY
N. E. Hart
his ATTORNEY

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED DEVICE.

1,060,265.  Specification of Letters Patent.  Patented Apr. 29, 1913.

Application filed May 31, 1912.  Serial No. 700,573.

*To all whom it may concern:*

Be it known that I, JOSEPH F. LAMB, a citizen of the United States, and a resident of New Britain, in the county of Hartford, State of Connecticut, have invented certain new and useful Improvements in Electrically-Heated Devices, of which the following is a specification.

The object of this invention is to produce an electrically-heated device such as a stove, flat iron, or the like, having features of novelty and advantage.

More especially, by my invention I provide means for distributing the heat evolved in the heating unit to the surface to be heated without special reference to the location of the heating unit relative to the surface to be heated. This makes it possible to use heating units, the design and construction of which are in general like or similar, in connection with devices of various kinds, as distinguished from making a special form of unit for each device which it is desired to heat. This result is accomplished partly through the construction of the unit, which in essential features is the same for various uses, its shape merely being changed, and partly to the manner of mounting the unit in the device, and especially in the method of transmitting the heat from the unit, or its holder, to various parts of the surface to be heated.

I have illustrated two embodiments of the invention for the purpose of clearly disclosing its various features.

Figure 5:
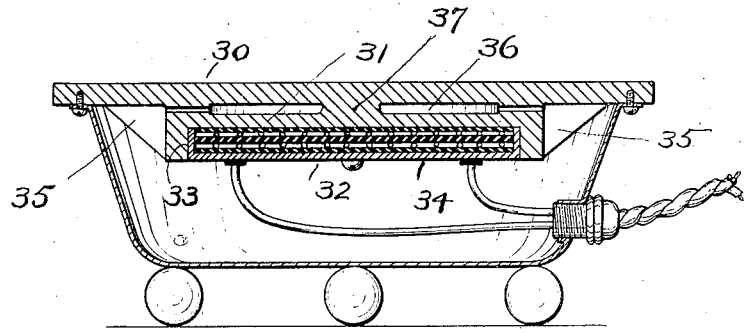
Figure 6:
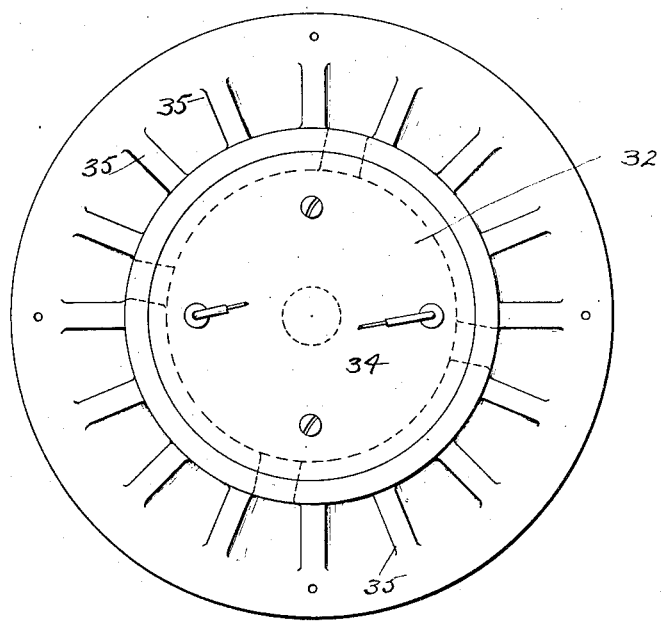

Figures 1, 2, 3 and 4 show the invention embodied in a sad iron. Figs. 5 and 6 show the invention embodied in a stove, or heating plate. Fig. 1 is a side view of a sad iron. Fig. 2 is a plan view thereof with the top removed. Fig. 3 is a side view of what is shown in Fig. 2. Fig. 4 is a central vertical section of what is shown in Figs. 2 and 3. Fig. 5 is a side view of a stove, the base being broken away and the heating plate shown in section. Fig. 6 is a bottom view of the heating plate.

Referring to Figs. 1 to 4 inclusive, the iron is denoted at $a$, and $b$ is the cover secured thereto as by the screws $d\ d$. The cover may be weighted if desired and is provided with a suitable handle $c$. The heating unit 1 is located on a support or platform 2 recessed as illustrated. 3 denotes the surface to be heated which in this case is the sole of the iron. A recess 4 is formed between the platform 2, on which the unit is located, and the surface to be heated, the recess being connected with the base by the side webs 10, 10, the rearwardly projecting ribs 11, 11 and the forwardly extending web or tip 12. Since as shown these webs and ribs are formed integrally with the surface to be heated and with the socket, it will be seen that they are in heat-conductive relation with both and so constitute an effective means for transmitting the heat evolved in the unit from the platform or recess to the surface to be heated. The size or cross sectional area of these webs or ribs is calculated to produce the amount of heating effect which is desired. A preferred type of heating unit is illustrated and comprises a flat core of insulating material, such as mica, about which is wound a resistance coil 15 on either side of which are thin layers of insulating material 16, 17, such as mica. As illustrated the bottom of the recess or platform 2 forms one of the radiating plates, and on the opposite side of the unit there is located the radiating plate 18 having the edge flange 19 arranged in heat-conductive relation with the side walls of the socket. It will thus be seen that substantially all of the heat evolved in the unit is transmitted directly to the bottom and walls of the recess in which it is located, and by the webs and ribs 10, 11, 12 transmitted to the surface to be heated. The spacing of the bottom of the socket from the surface to be heated, as by the recess 4, is advisable in cases where otherwise the central portion of the surface to be heated, as the sole of the iron, would be overheated. It will be seen that when the cover $b$ is in place it provides an envelop of dead air surrounding the socket, ribs and heating unit, preventing to a large degree the dissipation of the heat. Other webs may be utilized in order to get a proper distribution of the heat as indicated at 20.

Referring particularly to Figs. 5 and 6 which show my invention embodied in a stove, 30 denotes the surface to be heated, 31 the platform to which the unit 32 is secured, 33 the socket in which the unit is located, a radiating plate 34 of the unit being in heat-conductive relation with the side walls of the socket. 35, 35 denote the webs of conducting material which carry the heat from the unit to the different parts of the surface to be heated. 36 denotes an air space between the platform and the surface to be heated, and 37 a central web which may be used in cases where it is desired to conduct some of the heat directly to the center of the plate 30 in order to accomplish a proper heating effect.

From a study of the two devices used as illustrations as embodiments of the invention, it will be seen that within reasonable limits the relative positions of the surface to be heated and the platform on which the unit is located is not material since means are provided for carrying the heat to different points and in proper or desirable amounts. Changes in the relative positions of the surface to be heated and the unit will probably require changes in the number and cross sectional area of the conducting webs. It will also be observed that by my invention, it is possible to use a practically standard form of unit for heating various devices rather than construct and shape the unit for special uses.

I do not wish to be understood as limiting the adaptation of my invention to the embodiments which have been selected for illustration as I am aware that there are various devices in which the present invention can be utilized by changing the form or shape of the parts, but still retaining the important features here disclosed.

I claim:

1. In a device of the character described a mass of heat conducting material comprising heat-receiving and heat-yielding sections connected together at different points by webs of desired heat conductive capacity, and an electrical heater arranged in heating relation with said heat-yielding section.

2. In a device of the character described a mass of heat conducting material, comprising heat-receiving and heat-yielding sections spaced from one another in some portions and connected together at other points by webs of desired heat-conductive capacity, and an electrical heater arranged in heating relation with said heat-yielding section.

3. In a device of the character described a mass of heat conducting material comprising heat-receiving and heat-yielding sections, the latter being provided with a socket, said sections being connected together by webs of suitable heat conductive capacity, and an electrical heater located in said socket in heating relation with said heat-yielding section.

4. In a device of the character described a surface to be heated, a platform formed integrally therewith but spaced therefrom in some portions and connected thereto at other points by webs of desired heat conductive capacity, a flat electrical heater located on the platform and a plate of heat conducting material arranged against the upper side of the heater and in heat conductive relation with the platform.

5. In a device of the character described a surface to be heated, a platform formed integrally therewith but spaced therefrom in some portions and connected thereto at other points by webs of desired heat conductive capacity, said platform being provided with a socket, a flat electrical heater located within the socket against the upper side of said heater and in heating relation with the walls of the socket.

6. In a device of the character described a mass of heat conducting material, comprising heat-receiving and heat-yielding sections, the latter being provided with a socket, said sections being connected together by webs of suitable heat conductive capacity, an electrical heater located in said socket in heating relation with the said heat yielding section, and a plate of conducting material arranged in heating relation with said heater and in heat conducting relation with the walls of the socket.

JOSEPH F. LAMB.

Witnesses:
 JACOB WIEGAND, Jr.,
 E. ANDREWS.